US011623650B2

(12) United States Patent
Lee et al.

(10) Patent No.: US 11,623,650 B2
(45) Date of Patent: Apr. 11, 2023

(54) VEHICLE RANGE PREDICTION

(71) Applicants: Hyundai Motor Company, Seoul (KR); Kia Motors Corporation, Seoul (KR)

(72) Inventors: Kevin Lee, Los Angeles, CA (US); Antonio Gomez, Chino, CA (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/178,718

(22) Filed: Feb. 18, 2021

(65) Prior Publication Data

US 2022/0258743 A1 Aug. 18, 2022

(51) Int. Cl.
  *G06F 17/10* (2006.01)
  *B60W 40/13* (2012.01)
  *G07C 5/08* (2006.01)

(52) U.S. Cl.
  CPC ............. *B60W 40/13* (2013.01); *G07C 5/085* (2013.01); *B60W 2510/0657* (2013.01); *B60W 2510/083* (2013.01); *B60W 2520/10* (2013.01); *B60W 2520/105* (2013.01); *B60W 2520/12* (2013.01); *B60W 2520/125* (2013.01); *B60W 2530/10* (2013.01); *B60W 2530/203* (2020.02)

(58) Field of Classification Search
  CPC .......... B60W 40/13; B60W 2530/203; B60W 2510/0657; B60W 2510/083; B60W 2520/10; B60W 2520/105; B60W 2520/12; B60W 2520/125; B60W 2530/10; G07C 5/085
  See application file for complete search history.

(56) References Cited

U.S. PATENT DOCUMENTS

| 9,834,111 B2 | 12/2017 | Grewal et al. | |
| 2013/0079962 A1* | 3/2013 | Ishikawa | B60L 15/2045 701/22 |
| 2015/0179003 A1* | 6/2015 | Cooper | B61L 25/02 701/31.4 |
| 2022/0176832 A1* | 6/2022 | Espig | B60W 20/10 |

* cited by examiner

*Primary Examiner* — Adam M Alharbi
(74) *Attorney, Agent, or Firm* — Fox Rothschild LLP

(57) ABSTRACT

A system is provided for vehicle range prediction. The system determines a change in mass to a vehicle while driving. Additionally, the system calculates a vehicle load in response to determining the change in mass and adjusts a vehicle range in response to calculating the vehicle load. The vehicle range is indicative of a distance in which the vehicle is predicted to travel with a remaining fuel. The adjusted vehicle range is based on the vehicle load.

18 Claims, 7 Drawing Sheets

| Tow Mass | Tow Level |
|---|---|
| Baseline (<250kg) | 0 |
| 250~500 kg | 1 |
| 500~1000 kg | 2 |
| 1000~1500 kg | 3 |
| +1500 kg | 4 |

FIG. 5A

| Tow Mass Weight / Level | 1 | 2 | 3 | 4 |
|---|---|---|---|---|
| | 500 kg | 1000 kg | 1500 kg | >1500 kg |
| 10 | 116 | 108 | 104 | 100 |
| 20 | 124 | 114 | 110 | 105 |
| 30 | 115 | 110 | 106 | 101 |
| 40 | 112 | 107 | 100 | 95 |
| 50 | 106 | 101 | 96 | 91 |
| 60 | 104 | 98 | 92 | 88 |
| 80 | 78 | 70 | 62 | 54 |
| 100 | 59 | 55 | 51 | 49 |
| 120 | 49 | 42 | 38 | 34 |

FIG. 5B

VEHICLE RANGE PREDICTION

TECHNICAL FIELD

The present disclosure relates generally to vehicles, and more particularly, to vehicle range prediction.

BACKGROUND

A vehicle can travel a certain distance based on the amount of remaining fuel or power in a vehicle. Predicting this distance or range in which the vehicle travels aids trip planning. But the range of the vehicle varies depending on a tow load or a change in mass to the tow load, presenting difficulties in predicting the range of the vehicle.

The tow load presents uncertainty in the range in which the vehicle can travel. More worrisome, the tow load can change weight at different parts of the trip, causing an original prediction to be inaccurate. Currently, vehicles predict the vehicle range only after a long period of driving with the tow load, which creates difficulties for vehicle occupants to appropriately plan for trips.

SUMMARY

The present disclosure provides methods, systems, articles of manufacture, including computer program products, for vehicle range prediction.

In one aspect, there is provided a system including at least one processor and at least one memory. The at least one memory may store instructions. When executed by the at least one data processor, the instructions may cause the at least one data processor to at least determine a change in mass to a vehicle while driving, calculate a vehicle load in response to determining the change in mass; and in response to calculating the vehicle load, adjust a vehicle range indicative of a distance in which the vehicle is predicted to travel with a remaining fuel, the vehicle range based on the vehicle load.

In some variations, one or more of the features disclosed herein including the following features can optionally be included in any feasible combination. In some implementations, the vehicle load is calculated based on data received from at least one of an accelerometer, a motor torque sensor, and a vehicle speed sensor, and wherein the vehicle load is calculated based on a vehicle speed and a motor torque.

In some variations, the vehicle load is calculated while the vehicle is moving, wherein the vehicle load is further calculated based on a curbside vehicle weight and a cargo load, and wherein the vehicle load is calculated based on a rolling resistance calculation and a motor efficiency calculation.

In some variations, determining the change in mass to the vehicle is based on a motor torque necessary to maintain the vehicle at a speed, and the vehicle load is based on a curbside vehicle weight and a cargo load.

In some variations, the operations further comprise determining a current wheel demand energy based on the vehicle load and a sensor reading from at least one of an accelerometer and a motor torque; determining a fuel efficiency reduction factor based on a comparison between the current wheel demand energy and a prior wheel demand energy, the prior wheel demand energy based on a prior vehicle load and a prior data reading from at least one of an accelerometer and a motor torque; and adjusting the vehicle range based on the fuel efficiency reduction factor.

In some variations, the fuel efficiency reduction factor is calculated by determining a difference of the prior wheel demand energy and the current wheel demand energy and dividing the difference by the prior wheel demand energy.

In some variations, the vehicle range is adjusted to the product of the remaining fuel and a towing fuel economy indicative of a fuel consumption rate over a distance with the vehicle load, the towing fuel economy based on the fuel efficiency reduction factor.

In some variations, calculating the towing fuel economy is further based on calculating a difference between a prior fuel economy and the product of the fuel efficiency reduction factor and the prior fuel economy.

In some variations, the operations further comprise determining a current towing fuel economy over time based on the remaining fuel and a distance traveled; and in response to determining the vehicle is predicted to not reach the distance originally calculated based on the towing fuel economy, updating the vehicle range based on the remaining fuel and the current towing fuel economy, the current towing fuel economy being lower than the towing fuel economy.

In some variations, the operations further comprise determining a towing fuel economy estimation in a look-up table based on the vehicle load; and adjusting the vehicle range based on the towing fuel economy estimation, the towing fuel economy estimation indicative of a fuel consumption rate over a distance with the vehicle load.

In some variations, the vehicle load is a towing load calculated by subtracting a curbside vehicle weight from a total vehicle load, and wherein the look-up table provides the towing fuel economy estimation based on the vehicle and the towing load traveling at a speed.

In some variations, wherein the operations further comprise determining a current towing fuel economy over time based on the remaining fuel and a distance traveled; and in response to determining the vehicle is predicted to not reach the distance originally calculated based on the towing fuel economy estimation, updating the vehicle range based on the remaining fuel and the current towing fuel economy, the current towing fuel economy being lower than the towing fuel economy estimation.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer-implemented methods consistent with one or more implementations of the current subject matter can be implemented by one or more data processors residing in a single computing system or multiple computing systems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting.

The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5A depicts a table illustrating a towing load corresponding to a tow level;

FIG. 5B depicts a table illustrating a towing level corresponding to a fuel economy estimation based on an average vehicle speed;

DETAILED DESCRIPTION

Figure 1:
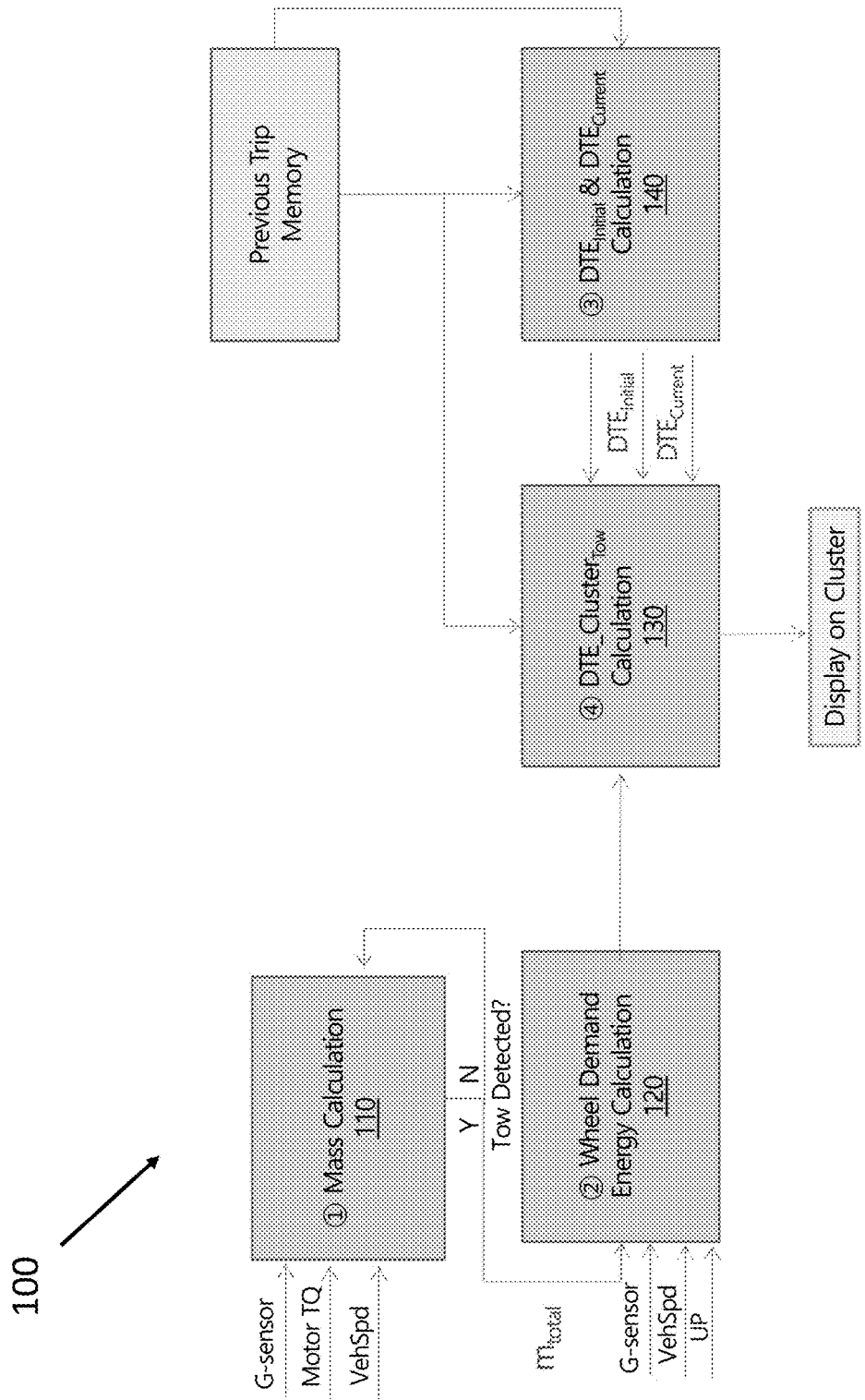
FIG. 1 depicts an example of a flowchart for determining a vehicle range based on the vehicle mass and the wheel demand energy calculation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present embodiments may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A vehicle range may be adjusted in response to determining a change in vehicle mass. The vehicle range may be indicative of a distance in which the vehicle is predicted to travel with the remaining fuel. Adjusting the vehicle range enables vehicle occupants to better predict the range the vehicle travels when the vehicle mass changes. The vehicle may monitor the vehicle mass to determine a change in mass to the vehicle while driving. When a change in mass is determined, the vehicle may calculate a vehicle load. The vehicle load affects the predicted range of the vehicle.

A change in mass to the vehicle may occur during a trip or between trips. Examples of a change in vehicle mass include attaching a trailer, attaching a towing hitch pulling a load, adding a rooftop carrier, an increase to the weight inside the vehicle cabin, a change to the weight due to the occupants in the vehicle, a change to the load carried by the vehicle, or a change to the load that the vehicle is towing. Unlike previous solutions to predicting fuel economy, determining the vehicle mass provides an efficient way to estimate the range of the vehicle without requiring the vehicle to travel a great distance. Also, unlike previous solutions, the vehicle may determine the change in mass without requiring a signal that a towing load has hitched to the vehicle or another manual input. Rather, the vehicle may dynamically determine the range of the vehicle by calculating the vehicle load.

The vehicle range may be determined based on a wheel demand energy. The wheel demand energy may be determined based on the vehicle load. The wheel demand energy may be determined based on a sensor reading an accelerometer or a motor torque. The wheel demand energy may be compared to a previous wheel demand energy to determine how much the fuel efficiency is reduced from an original range prediction. In other embodiments, the vehicle range may be determined based on a look-up table. The look-up table may be based on the vehicle load. The look-up table may determine a towing fuel economy estimation, which is indicative of a fuel consumption rate over a distance with the vehicle load.

The methods, systems, apparatuses, and non-transitory storage mediums described herein adjust a vehicle range in response to determining a change in vehicle mass and calculating a vehicle load. The various embodiments also contemplate adjusting the vehicle range based on a look-up table and a comparison of wheel demand energies prior to and during towing.

FIG. 1 depicts an example of a flowchart for determining a vehicle range based on the vehicle mass and the wheel demand energy calculation. The vehicle range predictor flowchart 100 may determine how much a vehicle range prediction is to be adjusted. The vehicle range predictor flowchart 100 may continuously monitor the vehicle for a change in mass to the vehicle while driving. The vehicle range predictor flowchart 100 may be triggered by a signal from a vehicle sensor or a manual input from a vehicle occupant indicating that a change in mass to the vehicle may occur.

At 110, data may be collected from vehicle sensors and, more particularly, data is collected from a motor torque sensor, an acceleration sensor, and a vehicle speed sensor. The change in mass to the vehicle may be based on data from the motor torque sensor. Data from the motor torque sensor may determine the force of the motor necessary to drive the vehicle. Additionally, data from the motor torque sensor may determine a change in the motor output necessary to maintain the vehicle at a speed. Data from the acceleration sensor may determine a change in torque due to an increase in mass to the tow load. Data from the motor torque sensor may be compared to data from the acceleration sensor to determine that the vehicle requires a greater motor output to maintain a similar acceleration of the vehicle without a tow load.

The change in mass to the vehicle may be based on data from the acceleration sensor. The acceleration sensor may be an accelerometer or a G-force sensor. The acceleration sensor may determine the acceleration of the vehicle. Data from the acceleration sensor may determine the change in inertia of the vehicle. Data from the acceleration sensor may determine the road conditions affecting the movement and velocity of the vehicle. Data from the acceleration sensor may determine an increase in vehicle inertia due to an increase in mass to the tow load. Data from the acceleration sensor may be compared to data from the motor torque sensor to determine that the vehicle has a slower acceleration with a similar motor output to a vehicle without a tow load.

The change in mass to the vehicle may be based on data from the vehicle speed sensor. The vehicle speed sensor may measure the velocity of the vehicle. Data from the vehicle speed sensor may measure the inertia of the vehicle. Data from the vehicle speed sensor may measure a slower vehicle speed due to a heavier tow load. Data from the vehicle speed sensor may be compared to data from the motor torque sensor to determine that the vehicle has a slower velocity with a same or comparable motor output of a vehicle without a tow load.

The vehicle load or vehicle mass may be calculated based on data received from the accelerometer, a motor torque sensor, and a vehicle speed sensor. Data received from the accelerometer, a motor torque sensor, and a vehicle speed sensor may be variables in an equation to determine the vehicle load. The vehicle load may be expressed by the following equation:

$$m_{total} = \frac{\int_{t0}^{t1} \left[ \frac{\eta_{Mot}}{r_{tire}} \tau_{Mot} - (f_0 + f_1 v + f_2 v^2) \right] dt}{\int_{t0}^{t1} (\dot{v} + g\sin\theta) dt}$$

Where m is the mass of the vehicle, $\tau_{Mot}$ the torque of the motor, $r_{tire}$ is the rolling resistance of the tire, $\eta_{Mot}$ is the efficiency of the motor, v is the velocity of the vehicle, $(f_0+f_1 v+f_2 v^2)$ are road load coefficients, v is the velocity of the vehicle, g is force of gravity and θ is the grade of the road along which the vehicle travels. Various data readings from sensors may be used to solve for the vehicle load. For example, calculating the vehicle load may be based on the measured torque of the motor. In turn, the measured torque of the motor may solve for the vehicle load.

The vehicle may include sensors for measuring the factors determinative of the vehicle load. For example, the vehicle could include additional sensors for measuring the rolling resistance of the tires of the vehicle and a motor efficiency to determine the vehicle load. The vehicle load may be calculated based on the data from the sensors that measure rolling resistance and motor efficiency. A rolling resistance calculation and a motor efficiency calculation may determine the vehicle load.

The vehicle load may be calculated by determining the inertia of the vehicle. The inertia of the vehicle may be expressed by the following equation:

$$m\dot{v} + mg \sin \theta$$

Where m is the mass of the vehicle, v is the velocity of the vehicle, g is force of gravity and θ is the grade of the road along which the vehicle travels. Calculating the vehicle load may be based on the vehicle speed or vehicle inertia. The vehicle speed may be indicative of the inertia of the vehicle. A faster inertia of the vehicle may indicate a heavier tow load of the vehicle under similar conditions. A slower inertia of the vehicle may indicate a lighter tow load of the vehicle under similar conditions. The inertia of the vehicle may be compared to a road load to determine the mass of the vehicle. The vehicle load may be calculated while the vehicle is moving. As the vehicle is moving, the inertia of the vehicle may be determined based on data from the vehicle speed sensor. The vehicle speed sensor may determine the inertia of the vehicle. Data readings from the vehicle speed sensor may determine whether the vehicle is moving.

The vehicle load may be calculated while the vehicle is moving. The moving vehicle may have a motor torque and a vehicle speed that may be used to calculate the vehicle load. The vehicle load may be further calculated based on a known curbside vehicle weight or a known cargo load.

Calculating the vehicle load may require calculating a vehicle speed and a motor torque and comparing the vehicle speed and the motor torque to prior measurements. For example, if the same vehicle speed with a towing load requires a higher motor torque, the vehicle load calculation may be based on the difference between the two motor torque measurements. In another example, if the same motor torque with the towing load results in a slower vehicle speed, the vehicle load calculation may be based on the difference between the two vehicle speeds.

The vehicle load may be calculated by determining the road load of the vehicle. The road load of the vehicle may be proportional to the motor torque output. The road load of the vehicle may be expressed by the following equation:

$$\frac{\eta_{Mot}}{r_{tire}}\tau_{Mot} - (f_0 + f_1 v + f_2 v^2)$$

Where $\tau_{Mot}$ is the torque of the motor, $r_{tire}$ is the rolling resistance of the tire, $\eta_{Mot}$ is the efficiency of the motor, v is the velocity of the vehicle, and $(f_0+f_1v+f_2v^2)$ are road load coefficients. The vehicle load is based on a curbside vehicle weight and a cargo load. If a change in mass is calculated, then the wheel demand energy may be calculated.

At 120, the wheel demand energy may be calculated. The wheel demand energy may be based on the vehicle load and a sensor reading from at least one of an accelerometer and a motor torque. The wheel demand energy may be calculated by determining the total force required to move the vehicle at a speed. The force required to move the vehicle may be determined by the inertia of the vehicle and the road load force. The force required to move the vehicle may be expressed by the following equation:

$$F_{Total\ Required} = m \cdot a + f0 + f1 \cdot v + f2 \cdot v^2$$

Where m is mass, v is velocity, and $(f_0+f_1v+f_2v^2)$ are road load coefficients. The wheel demand energy may be derived from the total force required to move the vehicle and the velocity of the vehicle.

The wheel demand energy may be calculated at different points in time. For example, the wheel demand energy may be calculated when the vehicle is moving but does not have a towing load. The wheel demand energy without the towing load may be expressed by the following equation:

$$\text{Wheel\_Demand\_Energy}_{(no\ tow\ load)} = \int_{t0}^{t1}(m_{no\ tow\ load} \cdot a + f0 + f1 \cdot v + f2 \cdot v^2) \cdot v\, dt$$

Where m is the mass of the vehicle, a is the acceleration of the vehicle, and $(f_0+f_1v+f_2v^2)$ are road load coefficients.

In another example, the wheel demand energy may be calculated when the vehicle is moving and has a towing load. The wheel demand energy with the towing load may be expressed by the following equation:

$$\text{Wheel\_Demand\_Energy}_{(with\ load)} = \int_{t0}^{t1}(m_{with\ load} \cdot a + f0 + f1 \cdot v + f2 \cdot v^2) \cdot v\, dt$$

Where m is the mass of the vehicle, a is the acceleration of the vehicle, and $(f_0+f_1v+f_2v^2)$ are road load coefficients.

A comparison of the wheel demand energy with the tow load and without the tow load may determine how much the towing fuel economy changes. For example, if the wheel demand energy with the tow load is 10% lower than the wheel demand energy without the tow load, then the fuel economy may be decreased by 10%. This comparison between the wheel demand energy with the tow load and without the tow load may determine the fuel efficiency reduction factor. The fuel efficiency reduction factor may also be determined by comparing the current wheel demand energy and a prior wheel demand energy. The prior wheel demand energy may be measured during a prior trip with a prior vehicle load and a prior data reading from at least one of an accelerometer and a motor torque. Additionally, and/or alternatively, the prior wheel demand energy may be measured during a prior trip with a known fuel economy. In some embodiments, the fuel efficiency reduction factor may be calculated by determining a difference of the prior wheel demand energy and the current wheel demand energy and dividing the difference by the prior wheel demand energy.

At 130, the vehicle range is adjusted. The vehicle range may be adjusted based on the fuel efficiency reduction factor. The vehicle range may be adjusted based on the comparison of the wheel demand energy with the tow load and without the tow load. The vehicle range may be adjusted based on the comparison of the current wheel demand energy and a prior wheel demand energy.

The vehicle range may be adjusted based on the towing fuel economy calculated based on the fuel efficiency reduction factor and the remaining fuel. The vehicle range may be adjusted to the product of the remaining fuel and a towing fuel economy indicative of a fuel consumption rate over a distance with the vehicle load, the towing fuel economy based on the fuel efficiency reduction factor. The updated vehicle range may be expressed by the following equation:

Updated Vehicle Range=Remaining Fuel*Towing Fuel Economy

Calculating the towing fuel economy may be further based on the fuel efficiency reduction factor. Calculating the towing fuel economy may be further based on calculating a difference between a prior fuel economy and the product of the fuel efficiency reduction factor and the prior fuel economy. Calculating the towing fuel economy may be expressed by the following equation:

Towing Fuel Economy=Prior Fuel Economy−(Fuel Efficiency Reduction Factor*Prior Fuel Economy)

For example, the prior fuel economy may be 30 miles per kilogram of fuel. The fuel efficiency reduction factor may be 10% based on the comparing the wheel demand energies. The towing fuel economy may be calculated to 27 miles per kilogram by calculating 10% of 30 and subtracting the product from 30.

The towing fuel economy may be calculated at various times while the vehicle is in motion. The towing fuel economy calculations may be stored in the vehicle memory. The towing fuel economy may be updated over time. The towing fuel economy calculation may be updated as an average of calculations or a median towing fuel economy of various towing fuel economy calculations.

At 140, the vehicle range may be calculated at various times while the vehicle is in motion. The vehicle range calculations may be stored in the vehicle memory. The vehicle range may be updated over time. The vehicle range calculations may be updated as an average of calculations or a median vehicle range of various vehicle range calculations.

A current towing fuel economy may be compared to the vehicle range calculations. The current towing fuel economy calculations may be compared to the calculated vehicle range based on the vehicle load to determine the accuracy of the calculations. The vehicle range calculation may be updated based on the current towing fuel economy if the vehicle range calculations are not accurate. The current towing fuel economy may be calculated based on the remaining fuel and the distance traveled. For example, the current towing fuel economy may be calculated by dividing the distance traveled by the remaining fuel in the vehicle. This calculation may be a learned fuel economy over an extended time duration of the vehicle. In some embodiments, the current towing fuel economy in fuel cell vehicles may be expressed by the following equation:

$$\text{Fuel Efficiency(Mi/kg)} = \frac{\text{Total Distance Travel}}{\frac{N_{\#}\text{ of cells}}{\text{Faraday's Constant} \times 1000}\int_{t0}^{t1}\text{FC\_Current}\,dt}$$

If the current towing fuel economy is lower than the calculated towing fuel economy, then the vehicle range may be updated based on the remaining fuel and the current towing fuel economy. The current towing fuel economy may be lower than the calculated towing fuel economy if the vehicle is not predicted to travel the distance based on the calculated towing fuel economy.

Similarly, if the vehicle range predicted based on the current towing fuel economy is lower than the vehicle range calculated based on the calculated towing fuel economy, then the vehicle range may be updated based on the remaining fuel and the current towing fuel economy. The updated vehicle range may be lower than the calculated vehicle range based on the towing fuel economy if the vehicle is not predicted to travel the distance based on the calculated towing fuel economy.

Figure 2:
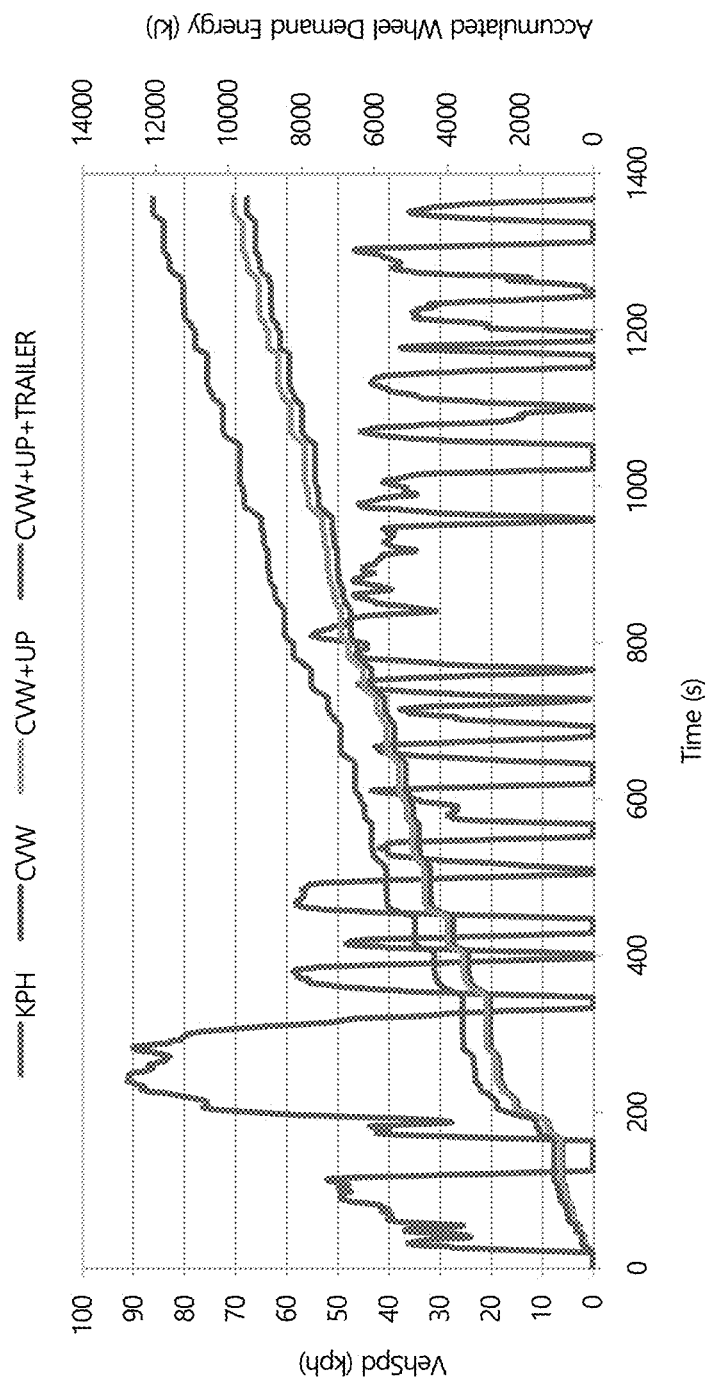
FIG. 2 depicts an example of a graph depicting a vehicle with a towing load having a higher accumulated wheel demand energy than the vehicle without the towing load.

FIG. 2 an example of a graph depicting a vehicle with a towing load having a higher accumulated wheel demand energy than the vehicle without the towing load. The accumulated wheel demand energy is directly related to the speed at which the vehicle is traveling. The greater the speed at which the vehicle is traveling, the greater the wheel demand energy. The vehicle with the tow load requires a greater wheel demand energy than the vehicle without the tow load. This greater wheel demand energy is shown by the higher accumulation of wheel demand energy by the vehicle with the towing load. The difference in accumulated wheel demand energy is minimal between a vehicle with two passengers and a vehicle without two passengers.

Figure 3:
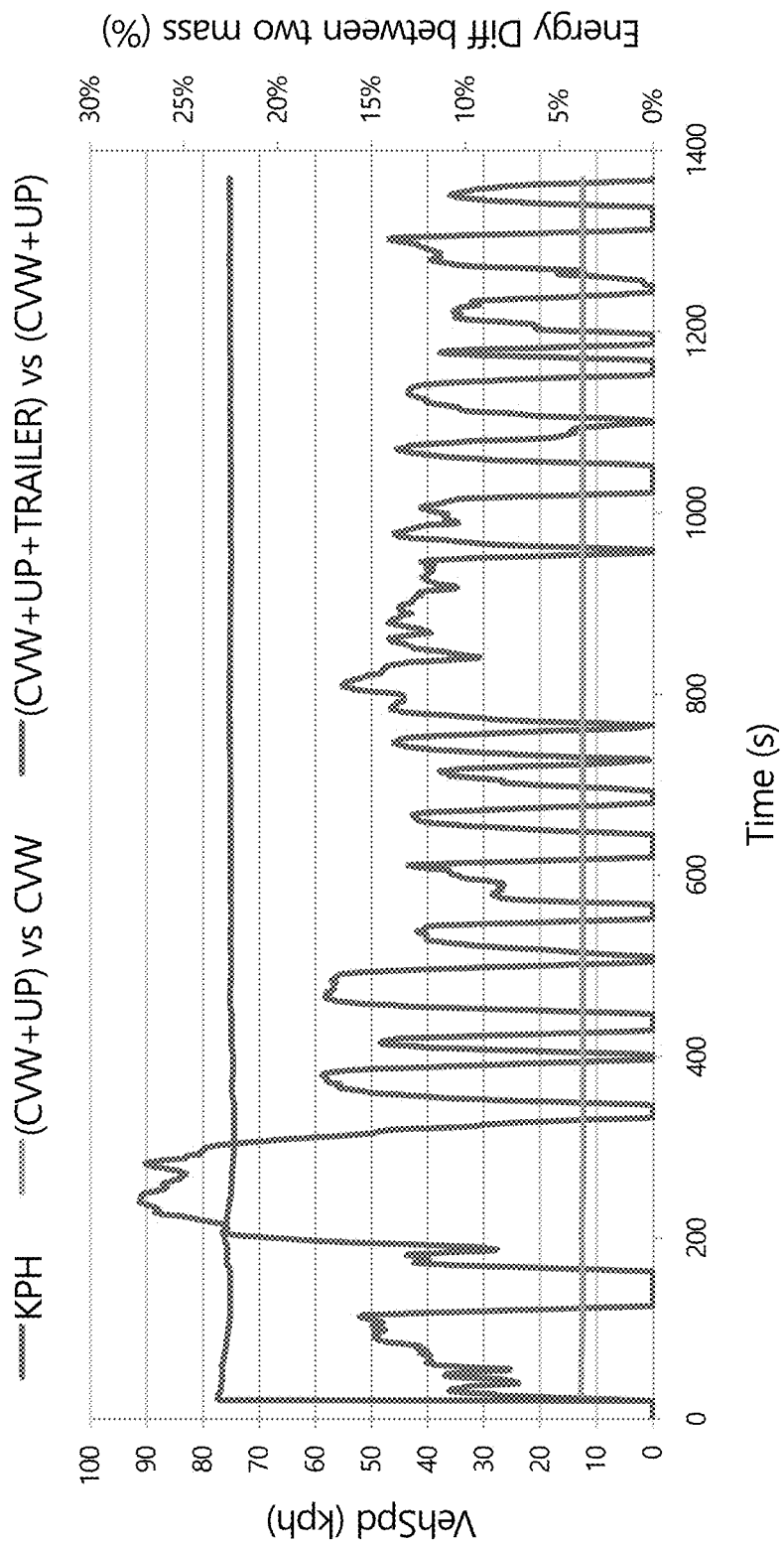
FIG. 3 depicts an example of a graph shows that the difference in accumulated wheel demand energy consumed by the vehicle with the towing load is a certain percentage of the accumulated wheel demand energy consumed by the vehicle without the towing load.

FIG. 3 depicts an example of a graph shows that the difference in accumulated wheel demand energy consumed by the vehicle with the towing load is a certain percentage of the accumulated wheel demand energy consumed by the vehicle without the towing load. While the wheel demand energy with the tow load is greater than the wheel demand energy without the tow load, the ratio between the wheel demand energy with the tow load and the wheel demand energy without the tow load is fairly consistent. For example, the wheel demand energy with the tow load is a certain percentage of the wheel demand energy without the tow load over a drive cycle.

Figure 4:
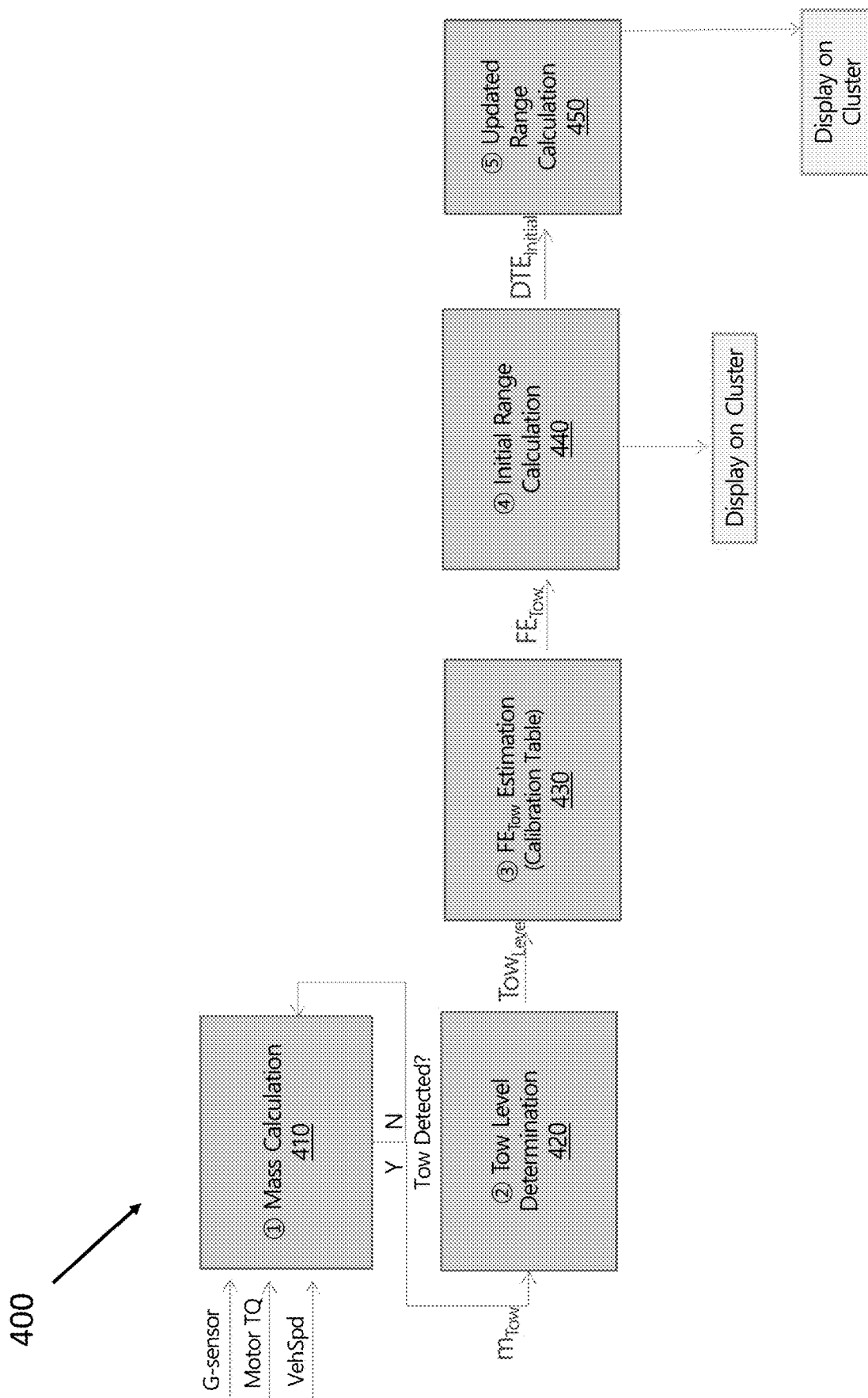
FIG. 4 depicts an example of a flowchart for determining a vehicle range based on a towing level and a towing fuel economy estimation.

FIG. 4 depicts an example of a flowchart for determining a vehicle range based on a towing level and towing fuel economy estimation. The vehicle range reference table flowchart 400 may determine how much a vehicle range prediction is to be adjusted based on a look-up table. The vehicle range reference table flowchart 400 may continuously monitor the vehicle for a change in mass to the vehicle while driving. The vehicle range reference table flowchart 400 may be triggered by a signal from a vehicle sensor or a manual input from a vehicle occupant indicating that a change in mass to the vehicle may occur. A known towing fuel economy estimation may be found in a look-up table. The towing fuel economy estimation may be indicative of a fuel consumption rate over a distance with the vehicle load. The known towing fuel economy estimation may be determined by the vehicle load. Using the known towing fuel economy estimation, the vehicle range may be adjusted.

At 410, data may be collected from vehicle sensors and, more particularly, data is collected from a motor torque sensor, an acceleration sensor, and a vehicle speed sensor. The change in mass to the vehicle may be based on data from the motor torque sensor. Data from the motor torque sensor may determine the force of the motor necessary to drive the vehicle. Additionally, data from the motor torque sensor may determine a change in the motor output necessary to maintain the vehicle at a speed. Data from the acceleration sensor may determine a change in torque due to an increase in mass to the tow load. Data from the motor torque sensor may be compared to data from the acceleration sensor to determine that the vehicle requires a greater motor output to maintain a similar acceleration of the vehicle without a tow load.

The change in mass to the vehicle may be based on data from the acceleration sensor. The acceleration sensor may be an accelerometer or a G-force sensor. The acceleration sensor may determine the acceleration of the vehicle. Data from the acceleration sensor may determine the change in inertia of the vehicle. Data from the acceleration sensor may determine the road conditions affecting the movement and velocity of the vehicle. Data from the acceleration sensor may determine an increase in vehicle inertia due to an increase in mass to the tow load. Data from the acceleration sensor may be compared to data from the motor torque sensor to determine that the vehicle has a slower acceleration with similar motor output to a vehicle without a tow load.

The change in mass to the vehicle may be based on data from the vehicle speed sensor. The vehicle speed sensor may measure the velocity of the vehicle. Data from the vehicle speed sensor may measure the inertia of the vehicle. Data from the vehicle speed sensor may measure a slower vehicle speed due to a heavier tow load. Data from the vehicle speed sensor may be compared to data from the motor torque sensor to determine that the vehicle has a slower velocity with a same or comparable motor output of a vehicle without a tow load.

The vehicle load or vehicle mass may be calculated based on data received from the accelerometer, a motor torque sensor, and a vehicle speed sensor. Data received from the accelerometer, a motor torque sensor, and a vehicle speed sensor may be variables in an equation to determine the vehicle load. The vehicle load may be expressed by the following equation:

$$m_{total} = \frac{\int_{t0}^{t1} \left[\frac{\eta_{Mot}}{r_{tire}}\tau_{Mot} - (f_0 + f_1 v + f_2 v^2)\right] dt}{\int_{t0}^{t1} (\dot{v} + g\sin\theta) dt}$$

Where m is the mass of the vehicle, $\tau_{Mot}$ is the torque of the motor, $r_{tire}$ is the rolling resistance of the tire, $\eta_{Mot}$ is the efficiency of the motor, v is the velocity of the vehicle, $(f_0+f_1 v+f_2 v^2)$ are road load coefficients, v is the velocity of the vehicle, g is force of gravity and θ is the grade of the road along which the vehicle travels. Various data readings from sensors may be used to solve for the vehicle load. For example, calculating the vehicle load may be based on the measured torque of the motor. In turn, the measured torque of the motor may solve for the vehicle load.

The vehicle may include sensors for measuring the factors determinative of the vehicle load. For example, the vehicle could include additional sensors for measuring a rolling resistance of the tires of the vehicle and a motor efficiency to determine the vehicle load. The vehicle load may be calculated based on the data from the sensors that measure a rolling resistance and a motor efficiency. A rolling resistance calculation and a motor efficiency calculation may determine the vehicle load.

The vehicle load may be calculated by determining the inertia of the vehicle. The inertia of the vehicle may be expressed by the following equation:

$$m\dot{v}+mg \sin \theta$$

Where m is the mass of the vehicle, v is the velocity of the vehicle, g is force of gravity and θ is the grade of the road along which the vehicle travels. Calculating the vehicle load may be based on the vehicle speed or vehicle inertia. The vehicle speed may be indicative of the inertia of the vehicle. A faster inertia of the vehicle may indicate a heavier tow load of the vehicle under similar conditions. A slower inertia of the vehicle may indicate a lighter tow load of the vehicle under similar conditions. The inertia of the vehicle may be compared to a road load to determine the mass of the vehicle. The vehicle load may be calculated while the vehicle is moving. As the vehicle is moving, the inertia of the vehicle may be determined based on data from the vehicle speed sensor. The vehicle speed sensor may determine the inertia of the vehicle. Data readings from the vehicle speed sensor may determine whether the vehicle is moving.

The vehicle load may be calculated while the vehicle is moving. The moving vehicle may have a motor torque and a vehicle speed that may be used to calculate the vehicle load. The vehicle load may be further calculated based on a known curbside vehicle weight or a known cargo load.

Calculating the vehicle load may require calculating a vehicle speed and a motor torque and comparing the vehicle speed and the motor torque to prior measurements. For example, if the same vehicle speed with a towing load requires a higher motor torque, the vehicle load calculation may be based on the difference between the two motor torque measurements. In another example, if the same motor torque with the towing load results in a slower vehicle speed, the vehicle load calculation may be based on the difference between the two vehicle speeds.

The vehicle load may be calculated by determining the road load of the vehicle. The road load of the vehicle may be proportional to the motor torque output. The road load of the vehicle may be expressed by the following equation:

$$\frac{\eta_{Mot}}{r_{tire}} \tau_{Mot} - (f_0 + f_1 v + f_2 v^2)$$

Where $\tau_{Mot}$ is the torque of the motor, $r_{tire}$ is the rolling resistance of the tire, $\eta_{Mot}$ is the efficiency of the motor, v is the velocity of the vehicle, and $(f_0+f_1v+f_2v^2)$ are road load coefficients. The vehicle load is based on a curbside vehicle weight and a cargo load. If a change in mass is calculated, then the wheel demand energy may be calculated.

At 420, a towing fuel economy estimation may be determined based on a look-up table. The look-up table may estimate the towing fuel economy based on the vehicle load and a vehicle speed. The look-up table may be organized by towing levels. Towing levels may be determined based on the calculated vehicle load. The tow level may correspond to a number indicative of a level of difficulty and weight of the vehicle load. The tow level may be a range of vehicle load weights. For example, the vehicle load with a tow mass between 250 kg and 500 kg may be assigned a tow level of 1, and the vehicle load with a tow mass between 500 kg and 1000 kg may be assigned a tow level of 2. In some embodiments, the vehicle load is a towing load calculated by subtracting a curbside vehicle weight from a total vehicle load.

At 430, the look-up table may provide fuel economy estimations based on the towing levels. The towing fuel economy estimations may correspond to a towing fuel economy estimation based on an average vehicle speed. The towing fuel economy estimation of the vehicle may be determined based on the tow level and the average speed of the vehicle. The towing fuel economy estimation may be indicative of a known fuel consumption rate over a distance with the vehicle load. Additionally, and/or alternatively, the towing fuel economy estimation of the vehicle may be predicted based on the vehicle load and the average speed of the vehicle. A towing fuel economy estimation may correspond to a specific vehicle load of a vehicle traveling at a particular speed. For example, a vehicle load of level 2 (1000 kg) of a vehicle traveling at an average speed of 50 kilometers per hour may have a predetermined towing fuel economy of 101 kilometers per kilogram of fuel. The look-up table provides the towing fuel economy estimation based on the vehicle and the towing load traveling at a speed.

At 440, the vehicle range is adjusted. The vehicle range may be adjusted based on the towing fuel economy estimation. For example, the vehicle range may be adjusted to the product of the remaining fuel and the towing fuel economy estimation, towing fuel economy estimation based on the look-up table. The updated vehicle range may be expressed by the following equation:

Updated Vehicle Range=Remaining Fuel*Towing Fuel Economy Estimation

The towing fuel economy may be calculated at various times while the vehicle is in motion. The towing fuel economy calculations may be stored in the vehicle memory. The towing fuel economy may be updated over time. The towing fuel economy calculation may be updated as an average of calculations or a median towing fuel economy of various towing fuel economy calculations.

At 450, the vehicle range may be calculated at various times while the vehicle is in motion. The vehicle range calculations may be stored in the vehicle memory. The vehicle range may be updated over time. The vehicle range calculations may be updated as an average of calculations or a median vehicle range of various vehicle range calculations.

A current towing fuel economy may be compared to the vehicle range calculations. The current towing fuel economy calculations may be compared to the calculated vehicle range based on the towing fuel economy estimation to determine the accuracy of the calculations. The vehicle range calculation may be updated based on the current towing fuel economy if the vehicle range calculations are not accurate based on the towing fuel economy estimation. The current towing fuel economy may be calculated based on the remaining fuel and a distance traveled. For example, the current towing fuel economy may be calculated by dividing the distance traveled by the remaining fuel in the vehicle. This calculation may be a learned fuel economy over an extended time duration of the vehicle. In some embodiments, the current towing fuel economy in fuel cell vehicles may be expressed by the following equation:

$$\text{Fuel Efficiency(Mi/kg)} = \frac{\text{Total Distance Travel}}{\frac{N_\# \text{ of cells}}{\text{Faraday's Constant} \times 1000} \int_{t0}^{t1} \text{FC\_Current} \, dt}$$

If the current towing fuel economy is lower than the towing fuel economy estimation, then the vehicle range may be updated based on the remaining fuel and the current towing fuel economy. The current towing fuel economy may be lower than the towing fuel economy estimation if the vehicle is not predicted to travel the distance based on the towing fuel economy estimation.

Similarly, if the vehicle range predicted based on the current towing fuel economy is lower than the vehicle range calculated based on the towing fuel economy estimation, then the vehicle range may be updated based on the remaining fuel and the current towing fuel economy. The updated vehicle range may be lower than the calculated vehicle range based on the towing fuel economy estimation if the vehicle is not predicted to travel the distance based on the towing fuel economy estimation.

FIG. 5A depicts a table illustrating a towing load corresponding to a tow level. A tow level may be determined based on the calculated vehicle load. The tow level may correspond to a number indicative of a level of difficulty and weight of the vehicle load. The tow level may be a range of vehicle load weights. For example, the vehicle load with a tow mass between 250 kg and 500 kg may be assigned a tow level of 1, and the vehicle load with a tow mass between 500 kg and 1000 kg may be assigned a tow level of 2.

FIG. 5B depicts a table illustrating a towing level corresponding to a towing fuel economy estimation based on an average vehicle speed. The towing fuel economy estimation of the vehicle may be determined based on the tow level and the average speed of the vehicle. The towing fuel economy estimation may be indicative of a known fuel consumption rate over a distance with the vehicle load. Additionally, and/or alternatively, the towing fuel economy estimation of the vehicle may be predicted based on the vehicle load and the average speed of the vehicle. A towing fuel economy estimation may correspond to a specific vehicle load of a vehicle traveling at a particular speed. For example, a vehicle load of level 2 (1000 kg) of a vehicle traveling at an average speed of 50 kilometers per hour may have a predetermined towing fuel economy of 101 kilometers per kilogram of fuel.

Figure 6:
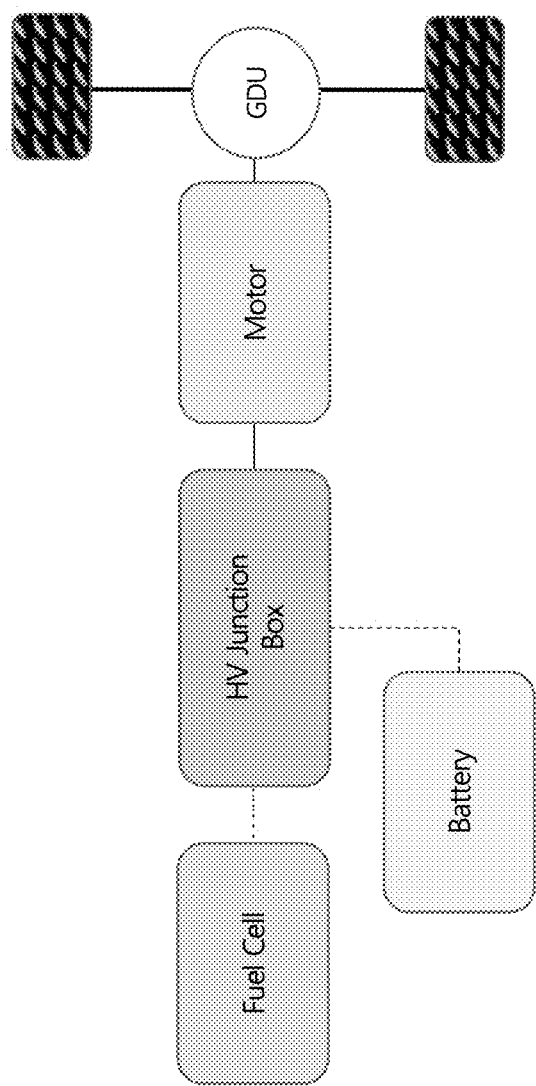
FIG. 6 depicts a diagram of an example of a vehicle with a fuel cell, a junction box, a motor, and a battery.

FIG. 6 depicts a diagram of an example of a vehicle with a fuel cell, a junction box, a motor, and a battery. The vehicle may be a fuel cell vehicle. The vehicle may convert energy from fuel cells to kinetic energy with the motor. The vehicle may be equipped with data sensors for calculating the load of the vehicle 105. The data sensors on the vehicle may include a LiDAR system, a RADAR system, a camera, a light detector, a motion detector, a proximity sensor, and/or the like to measure the inertia and speed of the vehicle.

A change in mass to the vehicle may occur during a trip or between trips. Examples of a change in vehicle mass include attaching a trailer, attaching a towing hitch pulling a load, adding a rooftop carrier, an increase to the weight inside the vehicle cabin, a change to the weight due to the occupants in the vehicle, a change to the load carried by the vehicle, or a change to the load that the vehicle is towing.

Figure 7:
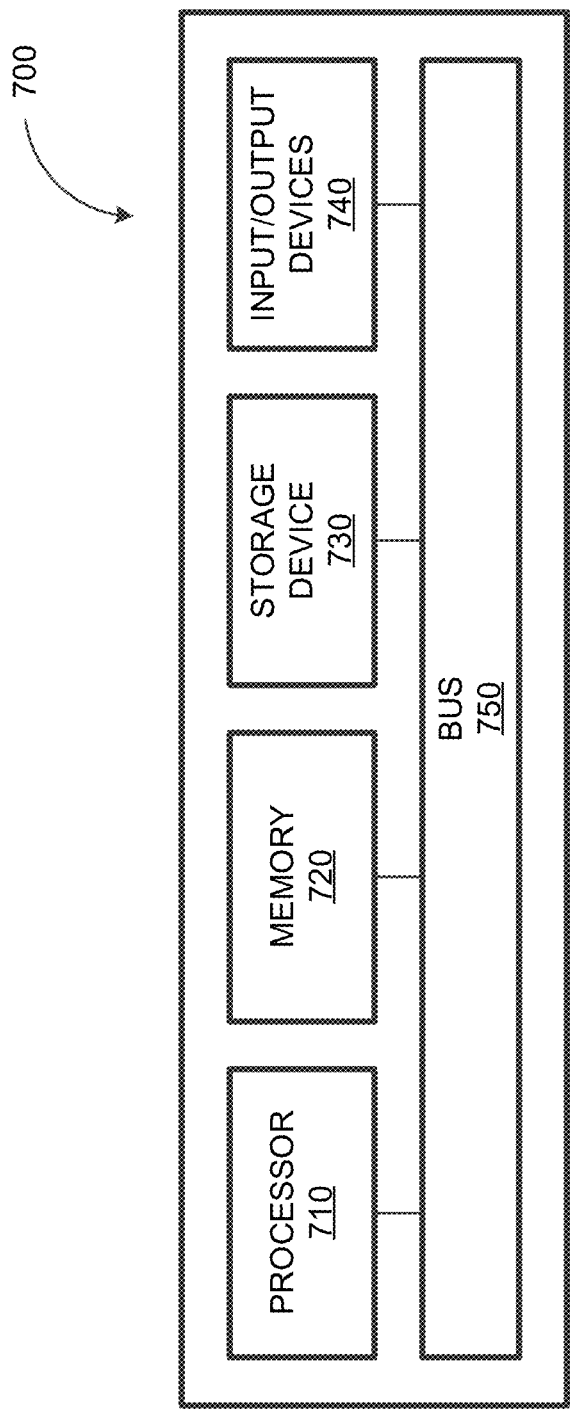
FIG. 7 depicts a block diagram illustrating a computing system consistent with implementations of the current subject matter.

FIG. 7 depicts a block diagram illustrating a computing system 700 consistent with implementations of the current subject matter. Referring to FIGS. 1-7, the computing system 700 can be used to adjust a vehicle range. For example, the computing system 700 may implement a user equipment, a personal computer, or a mobile device.

As shown in FIG. 7, the computing system 700 can include a processor 710, a memory 720, a storage device 730, and an input/output device 740. The processor 710, the memory 720, the storage device 730, and the input/output device 740 can be interconnected via a system bus 750. The processor 710 is capable of processing instructions for execution within the computing system 700. Such executed instructions can implement one or more components of, for example, cross-cloud code detection. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer-readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 740. The user interface can be generated and presented to a user by the computing system 700 (e.g., on a computer screen monitor, etc.).

The technical advantages presented herein may result in an efficient way to estimate the range of the vehicle without requiring the vehicle to travel a great distance. Unlike previous solutions to predicting fuel economy, determining the vehicle mass provides an efficient way to estimate the range of the vehicle without requiring the vehicle to travel a great distance. Also unlike previous solutions, the vehicle may determine the change in mass without requiring a signal that a towing load has hitched to the vehicle or another manual input. Rather, the vehicle may dynamically determine the range of the vehicle by calculating the vehicle load.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system comprising:
   a processor;
   a non-transitory computer-readable storage medium storing instructions that, when executed by the processor, cause the processor to perform operations comprising:
      determining a change in mass to a vehicle while driving, calculating a vehicle load in response to determining the change in mass;

in response to calculating the vehicle load, adjusting a vehicle range indicative of a distance in which the vehicle is predicted to travel with a remaining fuel, wherein the vehicle range is based on the vehicle load;

determining a current wheel demand energy based on the vehicle load and a sensor reading from at least one of an accelerometer and a motor torque;

determining a fuel efficiency reduction factor based on a comparison between the current wheel demand energy and a prior wheel demand energy, the prior wheel demand energy based on a prior vehicle load and a prior data reading from at least one of an accelerometer and a motor torque; and adjusting the vehicle range based on the fuel efficiency reduction factor.

2. The system of claim 1, wherein the vehicle load is calculated based on data received from at least one of an accelerometer, a motor torque sensor, and a vehicle speed sensor, and wherein the vehicle load is calculated based on a vehicle speed and a motor torque.

3. The system of claim 1, wherein the vehicle load is calculated while the vehicle is moving, wherein the vehicle load is further calculated based on a curbside vehicle weight and a cargo load, and wherein the vehicle load is calculated based on a rolling resistance calculation and a motor efficiency calculation.

4. The system of claim 1, wherein determining the change in mass to the vehicle is based on a motor torque necessary to maintain the vehicle at a speed, and the vehicle load is based on a curbside vehicle weight and a cargo load.

5. The system of claim 1, wherein the fuel efficiency reduction factor is calculated by determining a difference of the prior wheel demand energy and the current wheel demand energy and dividing the difference by the prior wheel demand energy.

6. The system of claim 1, wherein the vehicle range is adjusted to the product of the remaining fuel and a towing fuel economy indicative of a fuel consumption rate over a distance with the vehicle load, the towing fuel economy based on the fuel efficiency reduction factor.

7. The system of claim 6, wherein calculating the towing fuel economy is further based on calculating a difference between a prior fuel economy and the product of the fuel efficiency reduction factor and the prior fuel economy.

8. The system of claim 6, wherein the operations further comprise:

determining a current towing fuel economy over time based on the remaining fuel and a distance traveled; and in response to determining the vehicle is predicted to not reach the distance originally calculated based on the towing fuel economy, updating the vehicle range based on the remaining fuel and the current towing fuel economy, the current towing fuel economy being lower than the towing fuel economy.

9. The system of claim 1, wherein the operations further comprise:

determining a towing fuel economy estimation in a look-up table based on the vehicle load; and adjusting the vehicle range based on the towing fuel economy estimation, the towing fuel economy estimation indicative of a fuel consumption rate over a distance with the vehicle load.

10. The system of claim 9, wherein the vehicle load is a towing load calculated by subtracting a curbside vehicle weight from a total vehicle load, and wherein the look-up table provides the towing fuel economy estimation based on the vehicle and the towing load traveling at a speed.

11. The system of claim 10, wherein the operations further comprise:

determining a current towing fuel economy over time based on the remaining fuel and a distance traveled; and in response to determining the vehicle is predicted to not reach the distance originally calculated based on the towing fuel economy estimation, updating the vehicle range based on the remaining fuel and the current towing fuel economy, the current towing fuel economy being lower than the towing fuel economy estimation.

12. A non-transitory computer-readable storage medium storing instructions that, when executed by a processor, cause the processor to perform operations comprising:

determining a change in mass to a vehicle while driving, calculating a vehicle load in response to determining the change in mass; and in response to calculating the vehicle load, adjusting a vehicle range indicative of a distance in which the vehicle is predicted to travel with a remaining fuel, wherein the vehicle range is based on the vehicle load;

determining a current wheel demand energy based on the vehicle load and a sensor reading from at least one of an accelerometer and a motor torque;

determining a fuel efficiency reduction factor based on a comparison between the current wheel demand energy and a prior wheel demand energy, the prior wheel demand energy based on a prior vehicle load and a prior data reading from at least one of an accelerometer and a motor torque; and adjusting the vehicle range based on the fuel efficiency reduction factor.

13. The non-transitory computer-readable storage medium of claim 12, wherein the vehicle load is calculated based on data received from at least one of an accelerometer, a motor torque sensor, and a vehicle speed sensor, and wherein the vehicle load is calculated based on a vehicle speed and a motor torque.

14. The non-transitory computer-readable storage medium of claim 12, wherein the vehicle load is calculated while the vehicle is moving, wherein the vehicle load is further calculated based on a curbside vehicle weight and a cargo load, and wherein the vehicle load is calculated based on a rolling resistance calculation and a motor efficiency calculation.

15. The non-transitory computer-readable storage medium of claim 12, wherein determining the change in mass of the vehicle is based on a motor torque necessary to maintain the vehicle at a speed, and the vehicle load is based on a curbside vehicle weight and a cargo load.

16. The non-transitory computer-readable storage medium of claim 12, wherein the fuel efficiency reduction factor is calculated by determining a difference of the prior wheel demand energy and the current wheel demand energy and dividing the difference by the prior wheel demand energy.

17. The non-transitory computer-readable storage medium of claim 12, wherein the vehicle range is adjusted to the product of the remaining fuel and a towing fuel economy indicative of a fuel consumption rate over a distance with the vehicle load, the towing fuel economy based on the fuel efficiency reduction factor.

18. A computer-implemented method comprising:
  determining a change in mass to a vehicle while driving,
  calculating a vehicle load in response to determining the change in mass;
  in response to calculating the vehicle load, adjusting a vehicle range indicative of a distance in which the vehicle is predicted to travel with a remaining fuel, wherein the vehicle range is based on the vehicle load;
  determining a current wheel demand energy based on the vehicle load and a sensor reading from at least one of an accelerometer and a motor torque;
  determining a fuel efficiency reduction factor based on a comparison between the current wheel demand energy and a prior wheel demand energy, the prior wheel demand energy based on a prior vehicle load and a prior data reading from at least one of an accelerometer and a motor torque; and
  adjusting the vehicle range based on the fuel efficiency reduction factor.

* * * * *